US005339168A

United States Patent [19]

Evanitsky et al.

[11] Patent Number: 5,339,168

[45] Date of Patent: Aug. 16, 1994

[54] COPIER/DUPLICATOR NETWORK

[75] Inventors: Eugene S. Evanitsky; Tomlinson G. Rauscher, both of Pittsford; Joseph Filion, Fairport; Douglas Sundquist, Rochester; Riley Warddrip, Webster; Daniel Auman, Rochester, all of N.Y.

[73] Assignee: Xerox Corporation, Stamford, Conn.

[21] Appl. No.: 815,470

[22] Filed: Dec. 31, 1991

[51] Int. Cl.[5] .................... H04N 1/00

[52] U.S. Cl. .................... 358/402; 358/400; 358/403; 358/404; 355/204; 355/205; 355/206

[58] Field of Search .............. 358/400, 401, 402, 403, 358/404; 355/204, 205, 206, 207

[56] References Cited

U.S. PATENT DOCUMENTS

| | | | |
|---|---|---|---|
| Re. 32,253 | 9/1986 | Bartulis et al. | 355/14 C |
| 3,805,248 | 4/1974 | Morris et al. | 340/172.5 |
| 4,029,414 | 6/1977 | Rubenstein | 355/112 |
| 4,167,322 | 9/1979 | Yano et al. | 355/3 |
| 4,383,277 | 5/1983 | Kubo | 358/258 |
| 4,497,037 | 1/1985 | Kato et al. | 364/900 |
| 4,583,834 | 4/1986 | Seko et al. | 355/206 |
| 4,797,706 | 1/1989 | Sugishima et al. | 355/14 |
| 4,814,893 | 3/1989 | Katoh | 358/296 |
| 4,847,756 | 7/1989 | Ito et al. | 355/202 |
| 4,847,756 | 7/1989 | Itoh et al. | 364/200 |
| 4,896,223 | 1/1990 | Todome | 358/468 |
| 4,965,676 | 10/1990 | Ejiri et al. | 358/406 |
| 4,999,672 | 3/1991 | Rice, Jr. et al. | 355/202 |
| 5,077,582 | 12/1991 | Kravette et al. | 355/206 |
| 5,132,727 | 7/1992 | Benker | 355/133 |

FOREIGN PATENT DOCUMENTS

| | | |
|---|---|---|
| 3019480 | 11/1981 | France . |
| 3900982 | 8/1989 | France . |

*Primary Examiner*—Richard E. Chilcot, Jr.

*Assistant Examiner*—Rafael Bacares

*Attorney, Agent, or Firm*—Kenyon & Kenyon

[57] ABSTRACT

An apparatus for reading data from each of a plurality of image duplicating devices comprises a plurality of image duplicating devices each having a two-way communications port for receiving and transmitting data and a processing device electronically coupled to the two-way communications port of each of the image duplicating devices for receiving information from and transmitting information to each of the image duplicating devices. The apparatus allows each image duplicating device to be operated simultaneously with the processing device.

20 Claims, 1 Drawing Sheet

COPIER/DUPLICATOR NETWORK

BACKGROUND OF THE INVENTION

The present invention relates to an apparatus and method for managing networks of duplicating machines. More particularly, the present invention relates to an apparatus and method for reading data from a plurality of electronic reprographic machines for centralized storage and manipulation of that data.

It is becoming more and more common for businesses of even moderate size to employ several duplicating machines. As the number of duplicating machines at a particular business increases, the cost and effort associated with gathering information, such as billing data, and keeping users apprised of the current status of the various machines, i.e, which machines are available and capable of performing a given task, also increases.

Known methods for gathering, storing and manipulating data from a plurality of duplicating machines have been limited in the number of categories of data which they are capable of monitoring. Prior systems, therefore, tended to either inform a user of the current status of particular machines or keep track of billing data.

The information available from prior systems concerning the current status of the machines was usually limited to a few basic inquiries, such as is the machine in use, is the machine out of paper, is the machine out of service. To get more than this basic information, a user must go to the machine. In large offices, and when large numbers of originals need to be carted about, this is extremely inefficient.

Prior systems for monitoring billing information, such as Equitrac, have included separate interfaces into which the user inputs information such as an account number. These devices are hardwired into the duplicating machines and simply count the number of copies made for the particular account. Each of these devices is then linked to a central processing unit, usually a personal computer, where the data is compiled. However, these systems require a separate interface. In addition, these systems monitor only pulses from the duplicating machines indicative of the number of sheets delivered. Billing is based on this number alone and, therefore, different billing rates cannot be applied to the various types of copying jobs performed by the individual machines.

Many duplicating and facsimile machines include a two-way data port, which is commonly an RS232 type port. These systems, as more fully set out in U.S. Pat. No. 4,965,676 to Ejiri et al., utilize this port to allow remote diagnostic monitoring of duplicating machines. Through this system duplicating and facsimile machines may be connected to a remote monitoring station over telephone lines via the RS232 port. Various phenomena indicative of the state of the duplicating or facsimile machine are monitored by this system in order to alert the users to potential and actual service needs of the machines.

These RS232 ports may be linked to all of the data sources within the duplicating machines, including the various auditrons, memory locations for monitoring billing data, by modifying the internal computer software of the individual machines. Standard duplicating machines have 5 to 7 of these auditrons, each monitoring a different type of duplicating operation, such as two sided copying, enlargement, or reduction of documents.

There is thus a need for a system which is capable of monitoring various billing and other usage data from a plurality of duplicating machines via existing data ports and communicating this data via a single telephone line to a remote monitoring station and which is also capable of giving a user information on the current status of the individual machines on an increased number of topics.

The number of duplicates of documents now required by businesses of all size has made keeping the cost of reproduction services down a top priority. Systems such as Equitrac require hardware which must be added to the duplicating machines. In addition, as duplicating systems have become increasingly complex, the cost of making hardware modifications to these systems has also increased.

Thus there is a need for a system which is capable of monitoring an increased number of data fields from a plurality of duplicating machines without requiring extensive modifications to those machines.

An apparatus for gathering and storing data and for informing users of the current status of individual electrostatic copying machines was disclosed in U.S Pat. No. 4,167,322, to Yano et al. The apparatus disclosed in Yano et al. purported to allow a user to obtain information from any of six (6) categories including individual machine status and billing data. However, the apparatus of Yano et al. required that the data be processed in a microprocessor within one of the electrostatic copying machines. This apparatus also made use of this electrostatic copying machine as a printer for the system. In the system of Yano et al., reproduction activity must be interrupted on that machine any time the gathered data is printed and the manipulation of the data gathered is limited by the capabilities of the particular electrostatic machine employed as the data processor. In addition, this apparatus requires the purchase of at least one new electrostatic copying machine having the required microprocessor and printing capabilities.

There is thus a need for a system which is capable of processing and printing data gathered from a plurality of duplicating machines without interrupting the operation of any of the machines and which does not require the purchase of a specially manufactured duplicating machine.

SUMMARY OF THE INVENTION

These needs are met by the present invention which is directed to an apparatus for reading data from each of a plurality of image duplicating devices. The apparatus comprises a plurality of image duplicating devices each having a two-way communications port for receiving and transmitting data and a data processing device electronically coupled to the two-way communications port of each of the image duplicating devices for receiving information from and transmitting information to each of the image duplicating devices. The apparatus of the present invention allows each of the image duplicating devices to be operated simultaneously with the processing device.

The present invention is further directed to a network of image duplicating machines having a central data processing device which may be coupled via a single telephone line to a remote monitoring station.

DETAILED DESCRIPTION

Figure 1:
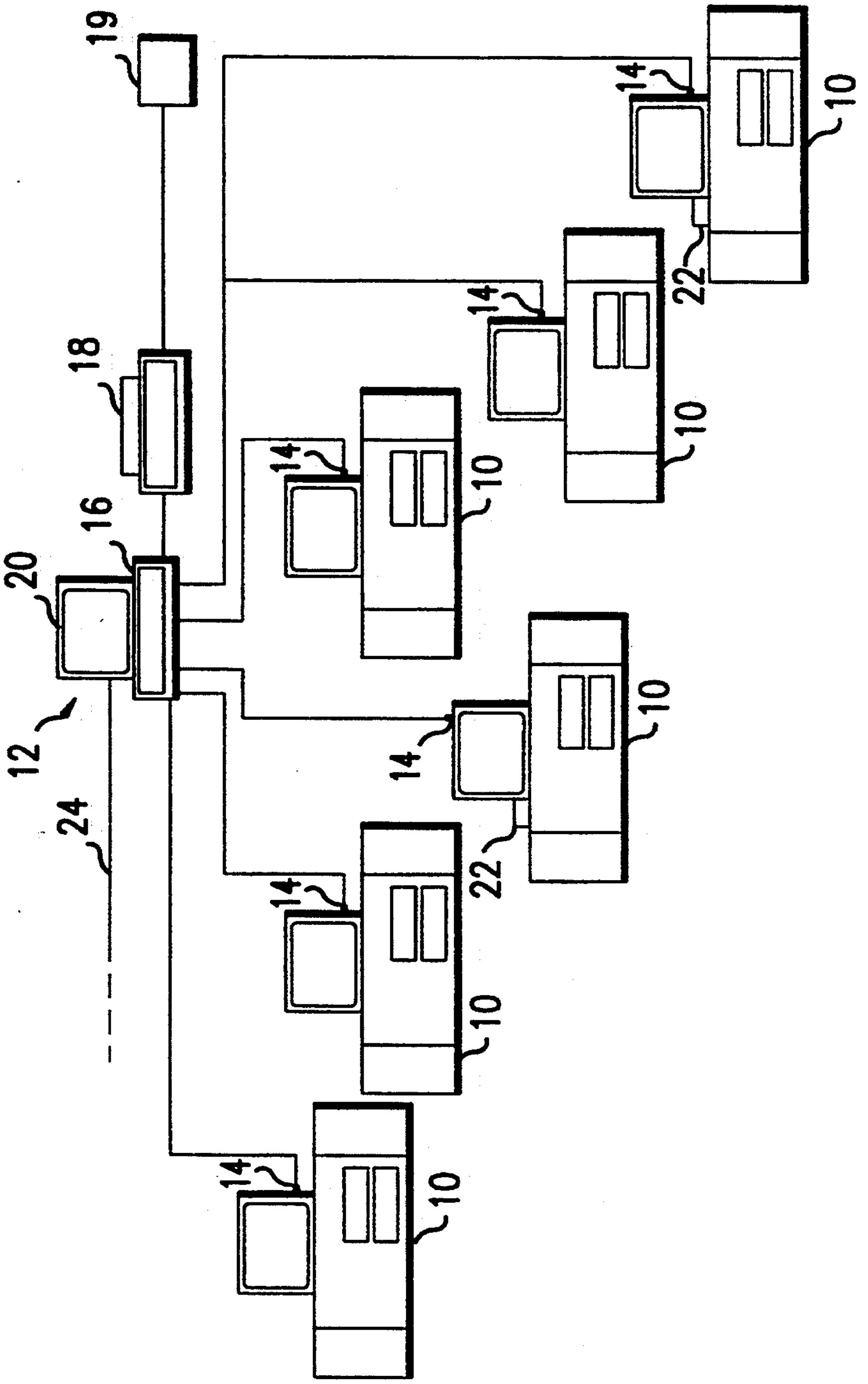
FIG. 1 shows a copier network according to a first embodiment of the invention.

Referring to FIG. 1, several duplicating machines 10 are shown, each connected to a central processing station 12 via the two-way communications port 14, which is preferably an RS232 type port. Each duplicating machine 10 may also include a user interface 22, which allows the user to enter billing information to the duplicating machine and which allows the user to select one of various duplicating operations performable by the machine. The central processing station 12 includes a computer 16, a printer 18, a telecopier machine 19, and a monitor 20 which may provide a constant display of the status of the various duplicating machines 10. As is well known in the art, the central processing station 12 may be connected to a network of computers, thereby allowing access to information from additional locations.

Each duplicating machine 10 includes several memory locations (not shown) for storing various types of data relating to the usage, performance history and current status of the machine. Each of the memory locations of a duplicating machine 10 may be linked to the machines two-way communications port 14 through known software commands which vary depending on the particular model of the duplicating machine. This data may then be accessed by the central processing station 12, which may then monitor the performance of the various duplicating machines 10. This allows the central processing station 12 to alert users to service requirements of the various machines. In addition, the central processing station may be coupled, via phone line 24, to a remote monitoring station which may provide servicing information to a several networks of duplicating machines.

Modern duplicating machines typically have 5 to 7 separate memory locations called auditrons. Each auditron records the extent of a particular type of duplicating operation. Modern machines, particularly those which are equipped with an RS232 type port, may also have memory locations which keep track of the frequency of malfunctions, such as paper jams, associated with the various duplicating operations performed by the duplicating machine 10. In addition, these machines are generally equipped with memory locations containing information as to the current status of the machine.

In operation, a user of a network according to the present invention may first consult the central processing station 12 to determine the location and availability of a duplicating machine capable of performing a desired duplicating function. The central processing station 12 then inquires of the various duplicating machines as to the availability of a suitable machine. The controlling software of the central processing station then selectively links itself to various memory locations in each machine via the two-way communications port 14 to determine the status of various machine parameters, eg. whether a machine is in use, what size paper is loaded into the machine and in what quantity, is the machine capable of handling a certain size original, etc. If a suitable machine is available, the user then proceeds to the identified duplicating machine 10. If there is no suitable duplicating machine 10 available, the user may instruct the central processing station 12 to notify him, via computer network 24, when a suitable machine becomes available.

Upon arriving at the identified machine, prior to initiating duplicating operations, a user may be required to input billing information for the job via user interface 22. The user also selects the particular duplicating operations to be performed via user interface 22. The central processing station 12 then accesses the billing information entered via user interface 22 and the auditron associated with the duplicating operation selected and records the number of each type of operation performed for the identified account. In this way, the network according to the present invention allows separate billing rates to be applied to various types of duplicating operations. For example, there is a cost reduction associated with making more than a minimum number of duplicates of the same document, and there is an increased cost associated with making enlargements or reductions of documents. These cost variations could be reflected in the billing rates for the respective operations.

Those skilled in the art will recognize that, by modification of the internal software of the various image duplicating machines 10, the two-way communications port 14 may be selectively linked to any of the internal data locations of the image duplicating machines. By linking central data processing station 12 to the various data locations of the image duplicating machines 10, numerous data processing operations are possible which were unavailable through previous systems. For example, accounts may be identified by name instead of by number. In addition, the system is capable of automatically producing bills and other communications and, when coupled to a telecopier, of sending these directly to clients.

There are various changes and modifications which may be made to the invention as would be apparent to those skilled in the art. However, these changes and modifications are included in the teaching of the disclosure, and it is intended that the invention be limited only by the scope of the claims appended hereto.

What is claimed is:

1. An image duplicating apparatus comprising:

a plurality of image duplicating devices each having a two-way communications port for receiving and transmitting data; and a data processing device electronically coupled to the two-way communications port of each of the image duplicating devices for reading information from and transmitting information to each of the image duplicating devices, wherein the data processing device is capable of reading information from at least one of the image duplicating devices while said image duplicating device is performing an image duplicating operation.

2. An apparatus according to claim 1 wherein the data processing device is a computer.

3. An apparatus according to claim 1 wherein the two-way communications port is an RS232 type port.

4. An apparatus according to claim 1, wherein the data processing device further includes means for printing data.

5. An apparatus according to claim 1, wherein at least one image duplicating machine is an electronic reprographic machine.

6. An apparatus according to claim 1, wherein the data processing device is selectively coupleable to a remote monitoring station, such that data from the image duplicating machines is selectively readable by the remote monitoring station.

7. An apparatus according to claim 6, wherein the remote monitoring station is selectively coupleable to the data processing device via a telephone line.

8. An apparatus according to claim 1, further comprising means, coupled to the data processing device, for electronically transmitting data to remote locations.

9. An apparatus according to claim 8, wherein the means for automatically transmitting data is a facsimile machine.

10. A method for reading data from and controlling a plurality of image duplicating machines, wherein each image duplicating machine includes a two-way communications port for receiving and transmitting data, comprising the steps of:

electrically coupling a data processing device to the plurality of image duplicating machines via each image duplicating machine's respective two-way communications port; and executing a control program for controlling the data processing device for selectively reading and storing data from at least one of the image duplicating machines during an image duplicating operation and transmitting data to the image duplicating machines.

11. A method according to claim 10, wherein at least one of the image duplicating machines includes a plurality of memory locations which may be accessed by the data processing device.

12. A method according to claim 10, wherein the data processing device transmits data to the image duplicating machines to control the operation of the image duplicating machines upon execution of the control program.

13. A method according to claim 10, further comprising the step of coupling the data processing device to a remote monitoring station, such that data from the image duplicating machines is selectively readable by the remote monitoring station.

14. A method according to claim 10, wherein at least one image duplicating machine is an electronic reprographic machine.

15. A method according to claim 10, further comprising the step of electronically coupling means for electronically transmitting image data to remote locations to the data processing device.

16. A method according to claim 15, wherein the means for electronically transmitting image data to remote locations is a facsimile machine.

17. An image duplicating apparatus comprising:

a plurality of image duplicating devices wherein each device includes a two-way communications port and a plurality of memory locations; and a data processing device electronically coupled to the two-way communications port of each of the image duplicating devices, the data processing device capable of reading information from the plurality of memory locations of at least one of the image duplicating devices during an image duplicating operation and providing an indication corresponding to a condition of said device.

18. The image duplicating apparatus of claim 17 wherein the data processing device further comprises a memory for storing an operational characteristic of each of the image duplicating devices.

19. The image duplicating apparatus of claim 18 wherein the data processing device is further capable of identifying an image duplicating device having a predetermined operational characteristic and indicating a current condition of the identified device.

20. The image duplicating apparatus of claim 19 wherein the data processing device is linked to a network.

* * * * *